[54] SYSTEM OF LONG-DISTANCE DIGITAL TRANSMISSION BY OPTICAL FIBER WITH COMPENSATION FOR DISTORTIONS AT SOURCE OF TRANSMISSION

[75] Inventors: Francis Pirio; Jean-Baptiste Thomine, both of Paris, France

[73] Assignee: France Telecom, Paris, France

[21] Appl. No.: 994,948

[22] Filed: Dec. 22, 1992

[30] Foreign Application Priority Data

Dec. 31, 1991 [FR] France ............... 91 16486

[51] Int. Cl.⁵ ........................................... H04B 10/00
[52] U.S. Cl. .................................. 359/161; 359/173; 359/181; 385/27
[58] Field of Search ................ 359/161, 173, 181–182, 359/188, 195, 124; 385/3, 27–28

[56] References Cited

U.S. PATENT DOCUMENTS

| | | | |
|---|---|---|---|
| 4,067,642 | 1/1978 | King et al. | 385/27 |
| 4,261,639 | 4/1981 | Kogelnik et al. | 385/27 |
| 4,969,710 | 11/1990 | Tick et al. | 385/123 |
| 4,979,234 | 12/1990 | Agrawal | 359/161 |
| 5,119,447 | 6/1992 | Trisno | 385/3 |
| 5,166,821 | 11/1992 | Huber | 359/188 |
| 5,224,183 | 6/1993 | Dugan | 359/161 |
| 5,261,016 | 11/1993 | Poole | 385/28 |

FOREIGN PATENT DOCUMENTS 2269309 2/1990 Japan .
2240683 8/1991 United Kingdom .

OTHER PUBLICATIONS

Iwashita et al: *Chromatic Compensation in Coherent Optical Communications*, Journal of Lightwave Technology, vol. 8, No. 3, Mar. 1990, pp. 367–375.
Blow and Doran: *Nonlinear effects in optical fibres and fibre devices*, IEEE Proceedings, vol. 134, No. 3, Jun. 1987, pp. 138–144.
Gnauck et al: *Dispersion Penalty Reduction using a Optical Modulator with Adjustable Chirp*, OFC 1991, Post-deadline No. 17, Article II, pp. 78–81.
Koyama et al: *Compensation for Nonlinear Pulse Distortion in Optical Fiber By Employing Prechirp Technique*, ECOC, Sep. 1991, WeC7-2, pp. 469–472.
Agrawal: *NonLinear Fibre Optics*, Academic Press, 1989, Chapter 6, "Optical Pulse Compression", pp. 147–171.
Dispersion Compensation by Active Predistorted Signal Synthesis (Koch) Journal of Light Wave Technology, vol. LT-3, No. 4, Aug. 1985, pp. 800–805.
Prechirp Technique for Dispersion Compensation for a High-Speed Long-Span Transmission (Saito) IEEE Photonics Technology Letters, vol. 3, No. 1, Jan. 1991. pp. 74–76.
Dispersion Penalty Reduction Using an Optical Modulator with Adjustable Chirp (Gnauck) IEEE Photonics Technology Letters, vol. 3, No. 10, Oct. 1991. pp. 916–918.
NonLinear Limits on Bandwidth at the Minimum Dispersion in Optical Fibres (Blow) (p. 2, 1.911) Optics Communication, vol. 48, No. 3, Dec. 1, 1993.
NonLinear Fiber Optics (Agrawal) (p. 2, 1.29–30) Acadamic press (1989).

*Primary Examiner*—Richard E. Chilcot, Jr.
*Assistant Examiner*—K. Negash
*Attorney, Agent, or Firm*—Merchant & Gould, Smith, Edell, Welter & Schmidt

[57] ABSTRACT

In a system for the long-distance transmission of a digital signal on a fiber-optic transmission line connecting a transmitter station and a receiver station, the digital signal has rising edges and descending edges between two predetermined signal levels, respectively representing the two binary values that can be assumed by the digital signal, the transmitter station comprising: device for the amplitude modulation of the digital signal, delivering an amplitude modulated signal; device for the modification of the instantaneous optical frequency of the amplitude modulated signal, at the instants corresponding to the rising and descending edges of the digital signal.

15 Claims, 3 Drawing Sheets

SYSTEM OF LONG-DISTANCE DIGITAL TRANSMISSION BY OPTICAL FIBER WITH COMPENSATION FOR DISTORTIONS AT SOURCE OF TRANSMISSION

BACKGROUND OF THE INVENTION

1. Field of the Invention

The field of the invention is that of very-long-distance digital transmission (several thousands of kilometers) on optical fibers using on-line optical amplification. The invention can be applied, for example, to the setting up of trans-ocean links.

One of the main factors limiting the bit rate in very-long-distance systems such as these is the distortion induced by the transmission fiber.

The invention relates notably to compensation for this distortion. More specifically, the system according to the invention relates to compensation, by anticipation at the source of transmission (i.e. at the transmitter station), for all the disturbances induced by the fiber and notably for the non-linear effects.

Indeed, the distortion given by the transmission fiber to the transmitted signals arises, in monomode fibers, out of the combined existence of two phenomena: chromatic dispersion and non-linear effects.

The first phenomenon is that of chromatic dispersion. This phenomenon results from the frequency dependency of the refractive index of silica. It entails different propagation times depending on the operating wavelength. In general, chromatic dispersion tends to widen the pulses of the digital trains and, hence, to prompt inter-symbol interferences.

In the usual fibers, the chromatic dispersion is zero around 1.3 $\mu$m and takes a positive value of about 17 ps/nm/km around 1.55 $\mu$m. It is also possible to use dispersion-shifted fibers which are designed to have zero chromatic dispersion in the region of 1.55 $\mu$m.

It has to be noted that the effect of distorsion by chromatic dispersion depends greatly on the spectral components of the pulses. Thus, if a pulse shows phase variations that are positive at its start and negative at its end, then this pulse will be greatly widened by a positive chromatic dispersion (the converse is true for negative dispersions).

Very-long-distance transmission systems (covering several thousands of kilometers) work at 1.55 $\mu$m. The excessive value of the chromatic dispersion of the usual fibers at this wavelength rules out their use. Hence, dispersion-shifted fibers are used systematically.

The second phenomenon relates to the non-linear effects. The most important non-linear effect in a fiber is the Kerr effect. This effect, which is described for example in the document by K. W. Blow and N. J. Doran, "Non-linear Effects in Optical Fibers and Fiber Devices" (IEEE Proceedings, June 1987, pp. 138–144) reflects a linear dependency of the refractive index of silica with respect to optical power.

This is very low in the usual fields of operation of the optical systems (distance smaller than 400 km and power below about 10 mW), but becomes non-negligible for very high power values (of the order of 1 W) or for very large propagation distances at reasonable levels of power (some thousands of kilometers in a periodic amplification system).

The non-linear effects give rise to a self-phase modulation. When a pulse is transmitted through a fiber with positive dispersion, it gets widened and the high frequency components are pushed towards the front or leading edge of the pulse. In a transmission through a fiber with negative dispersion, the width of the pulse is equally well increased but, in this case, the high-frequency components are pushed towards the rear or trailing edge of the pulse.

The distortion provided by the transmission fiber should be considered as the combination of the chromatic dispersion (the first phenomenon) and of the non-linear effects (the second phenomenon).

The combination of these two effects may be described by a non-linear equation with partial derivatives of distance and time, known as Schrödinger's nonlinear equation, the resolving of which is discussed notably in the work by G.

Agrawal, "Non-Linear Fiber Optics", Academic Press.

The numerical resolution of this equation shows that there are two qualitatively very different forms of behavior depending on the sign of the chromatic dispersion (D):

First case: $D>0$. In this case, phenomena of instability of modulation are observed. The pulses "burst" into very short pulses at the end of 1000 to 2000 km and the optical spectrum widens considerably: this may give rise to problems related to the optical passband.

Second case: $D<0$. There is no instability of modulation and the pulses keep a certain degree of integrity while the spectrum widens quasi-monotonically during the propagation, while keeping reasonable widths. However, the pulses widen greatly temporally, thus creating inter-symbol interferences. These interferences become very troublesome for example, as soon as the chromatic dispersion goes beyond 0.05 ps/nm/km in terms of absolute value for bit rates of 5 Gbits/s over distances of 6000 to 8000 km.

The most promising case is naturally the second one, that of a negative chromatic dispersion. However, to make the very-long-distance systems work in negative dispersion, the values of chromatic dispersion of the fibers used must obligatorily be very low.

2. Description of the Prior Art

Any method of compensation for the two phenomena that are the cause of the distortion in the fiber (chromatic dispersion and non-linear effects) is therefore very useful since it can be used to overcome the drawback of the low values imposed on the chromatic dispersion. Indeed, by using a method of compensation for the distortion provided by the transmission fiber, it is possible to envisage two strategies.

In a first strategy, for given characteristics of negative chromatic dispersion of the transmission fiber, the compensation can be used to increase the product: line bit rate * range of the link.

In a second strategy, for a fixed line bit rate and a fixed range, the compensation makes it possible to use transmission line fibers having the least stringent constraints as regards the characteristics of chromatic dispersion. These fibers are easier to manufacture on an industrial scale and to sort out for the setting up of an underwater link for example.

There are known methods of compensation at the source of transmission for distortions induced by the optical fiber line.

Thus one method, described for example by L. Koch and R. Alferness, in "Dispersion Compensation by Active Predistorted Signal Synthesis" in the *Journal of Lightwave Technology* (vol. LT3, No. 4, August 1985) consists in making the pulses undergo a continuous scanning of the optical frequency, for the duration of one bit, by over-modulation of the transmission laser.

For example, a pulse designed to be transmitted through a negative dispersion fiber (which will push the high frequency components towards the front edge of the pulse) will undergo an over-modulation of optical frequency in addition to the electro-optical amplitude modulation so that the high-frequency components are towards the rear edge of the pulse.

What is used here is the fact that the optical frequency of a semiconductor laser depends on its current. However, only certain structures of lasers can be applied to this method, for they display great "frequency modulation efficiency", i.e. a major variation of this optical frequency for a small variation in the control current and hence in the optical power.

Furthermore, this known method of compensation at the source of transmission is suited solely to compensation for the penalties entailed by chromatic dispersion. Furthermore, it considers only disturbances of this type. It does not directly relate to compensation for non-linear effects.

This method also has the drawback of necessitating a particular over-modulation that is synchronous with the useful digital train, on the transmission laser used. Consequently, only certain types of lasers, capable of giving a major variation of the optical frequency for a small variation in the control current, can be used in this method.

Finally, this method is applicable only to an on-line RZ code.

SUMMARY OF THE INVENTION

The invention is notably aimed at overcoming these different drawbacks of the prior art.

More specifically, an aim of the invention is to provide a system capable of compensating for the distortions of the signal generated by the non-linear effects introduced by the fiber-optic transmission line.

The invention is also aimed at providing a system such as this, capable of being installed irrespectively of the type of laser used at transmission, provided that its line width is moderate (some MHz).

Another aim of the invention is to provide a system such as this, that is applicable when the chromatic dispersion of the fiber is negative but also when the chromatic dispersion assumes a low positive value.

Yet another aim of the invention is to provide a system such as this that is compatible with numerous techniques of binary encoding, and notably with the RZ and NRZ codes.

Another aim of the invention is to provide a system such as this that is easy to implement.

These aims and others that shall appear hereinafter are achieved according to the invention by means of a system for the long-distance transmission of a digital signal on a fiber-optic transmission line connecting a transmitter station and a receiver station, said digital signal having rising edges and descending edges between two predetermined signal levels, respectively representing the two binary values that can be assumed by said digital signal, said transmitter station comprising:

means for the amplitude modulation of said digital signal, delivering an amplitude modulated signal;
means for the modification of the instantaneous optical frequency of said amplitude modulated signal, at the instants corresponding to said rising and descending edges of said digital signal.

According to the invention, the instantaneous optical frequency is therefore controlled so as to introduce predistortions into said amplitude modulated signal, said predistortions being designed to compensate substantially, by anticipation, for the non-linear disturbances of transmission due to said transmission line.

Thus, the signal to be transmitted is corrected by anticipation. It is deliberately modified at the source of transmission so that it is received without distortion in the receiver. From the viewpoint of the receiver, everything happens as if no disturbance (or very little disturbance) has been induced by the optical fiber.

The essential characteristic of the invention, therefore, is that it acts on the instantaneous optical frequency specifically at the instants when the digital signal shows transitions, so as to limit the disturbances due to the non-linear effects.

This technique of the invention should not be mistaken for the technique known as the "chirp" technique, which consists in applying a predefined and systematic self-phase modulation to each binary element and throughout the duration of this binary element (whether or not it has transitions and irrespectively of the instant at which these transitions appear). Indeed, this known method enables the correction of only the linear disturbances (chromatic dispersion). On the contrary, the invention enables the correction of the non-linear effects, taking account of the structure of the digital signal and especially of the transitions that it includes.

As shall be seen hereinafter, these two techniques may advantageously be combined together in a transmitter station according to the invention.

Advantageously, said means for the modification of the instantaneous optical frequency include phase modulation means, generating a phase modulation of said amplitude modulated signal.

The phase modulation applied in the system of the invention thus enables compensation for the self-phase modulation of the optical pulse due to the nonlinear effects.

Advantageously, said means for the modification of the instantaneous optical frequency act in such a way that said instantaneous optical frequency is substantially proportional to the derivative of said amplitude modulated signal.

Indeed, the self-phase modulation of the optical pulse due to the non-linear effects is a function of the optical power. Now, the optical power is related to the amplitude modulation and, more specifically, to its derivative. It is therefore advantageous to use a phase modulation as a function of this amplitude modulation.

In other words, this derivative can be used to detect the transitions of the digital signal (the instants when the power increases or diminishes). According to the invention, action is taken on the instantaneous optical frequency so that this frequency diminishes in the presence of a rising transition (or edge) and increases in the presence of a descending transition.

Preferably, said means for the modification of the instantaneous optical frequency take account of at least one of the information elements belonging to the group comprising:

the optical power along said transmission line;
the length of said optical fiber;
the coefficient of chromatic dispersion of said optical fiber;
the bit rate of said digital signal;
the binary coding format of said digital signal;
the distance between two repetition amplifiers placed on said transmission line;
the noise excess factor of said repetition amplifiers.

Thus, in the most advantageous case, the amplitude modulation (shape of the pulses and optical power) and the fiber used (its length and characteristics) are taken into account.

Advantageously, said transmitter station produces pulses for which the optical field is written as:

$$U(t) = A(t) \cdot e^{j\Phi(t)}$$

with:

$$\Phi(t) = \alpha |A(t)|^2$$

where:
A(t) is the amplitude of said optical field,
α is a constant,
t represents time,
the term A(t) corresponding to the contribution of said amplitude modulation means and the term $e^{j\Phi(t)}$ corresponding to the contribution of said means for the modification of the instantaneous optical frequency.

Advantageously, said amplitude modulation means produce an all-or-nothing modulation.

Preferably, said optical fiber is a monomode fiber with low negative chromatic dispersion.

In particular embodiments of the invention, said digital signal is encoded according to the RZ or NRZ binary format. However, it is of course possible for any type of encoding to be used.

In a first advantageous embodiment of the invention, said transmitter station includes an electro-optical amplitude modulator with two diffused optical waveguides, each of said optical waveguides being associated respectively with a first set and a second set of two electrodes, said first set of two electrodes being supplied with a first electrical voltage (V1) representing said digital signal and said second set of two electrodes being supplied with a second electrical voltage (V2) corresponding to the sum of said first electrical voltage reversed and a DC electrical voltage.

In this second voltage, the first, reversed voltage corresponds to the correction of the non-linear effects, and the DC voltage corresponds to the chirp for the correction of the linear effects.

Preferably, this modulator includes means for the adjusting of said DC voltage (adjusting of the chirp).

In a second advantageous embodiment of the invention, said transmitter station comprises:
an electro-optical amplitude modulator, controlled by an electrical signal (D) representing said digital signal and delivering an amplitude modulation signal, and
a phase modulator, acting on said amplitude modulated signal and controlled by said electrical signal (D) delayed by a period that is substantially equal to the delay introduced by said amplitude modulator.

In this case, it is advantageous for said delayed digital signal to be amplified by adjustable gain amplifier means. This gain corresponds to the "chirp" parameter.

Said amplitude modulator with two diffused optical waveguides or said phase modulator are, for example, are made of a lithium niobate crystal.

BRIEF DESCRIPTION OF THE DRAWINGS

Other features and advantages of the invention shall appear from the following description of a preferred embodiment of the invention, given by way of a non-restrictive example, and from the appended drawings of which:

FIG. 2 corresponding to a pulse sent with compensation according to the invention, and to the same pulse received at the end of the line when the chromatic dispersion of the fiber is zero;

FIG. 3 corresponding to a pulse sent without compensation and to the same pulse received at the end of the line when the chromatic dispersion of the fiber is negative;

FIG. 4 corresponding to a pulse sent with compensation according to the invention and to the same pulse received at the end of the line when the chromatic dispersion of the fiber is negative;

DETAILED DESCRIPTION OF THE INVENTION

In a very-long-distance digital transmission (relating to several thousands of kilometers) by optical fiber with on-line optical amplification, the optical pulses sent undergo a distortion. This distortion is due to the fiber itself and arises out of the combination of the non-linear effects (the Kerr effect in particular) and the chromatic dispersion in the transmission fiber.

The chromatic dispersion tends to widen the pulses temporally. Now, the non-linear effects tend to widen the spectrum of the pulse, and they consequently amplify the temporal widening due to the chromatic dispersion.

As has already been stated, studies relating to combination of these two effects (namely non-linear effects and chromatic dispersion) have shown that it is very useful to make the very-long-distance systems work in negative dispersion mode. However, the very low values of chromatic dispersion required make it difficult to prepare transmission-line fibers of this kind in practice.

The system according to the invention, which shall be described in greater detail hereinafter, can be used to compensate for the non-linear effects, even when the chromatic dispersion of the fiber is not zero (and assumes a negative value).

Thus, by preserving a transmission fiber that has given negative chromatic dispersion characteristics, the system according to the invention can be used to increase the product: (on-line bit rate) * (range of the link).

Now, following another strategy, by preserving a fixed on-line bit rate and a fixed range, the system according to the invention enables the use of line fibers that have less stringent constraints as regards the characteristics of chromatic dispersion and are therefore easier to manufacture on an industrial scale.

FIGS. 1 to 4 each show two graphs, each graph comprising two curves:
- a first curve of variation of the optical power PO as a function of time, this first curve being shown in a solid line;
- a second curve of variation of the optical instantaneous frequency FI (corresponding to the derivative with respect to the time of the phase) as a function of the time t. This second curve is shown in dashes.

Figure 1:
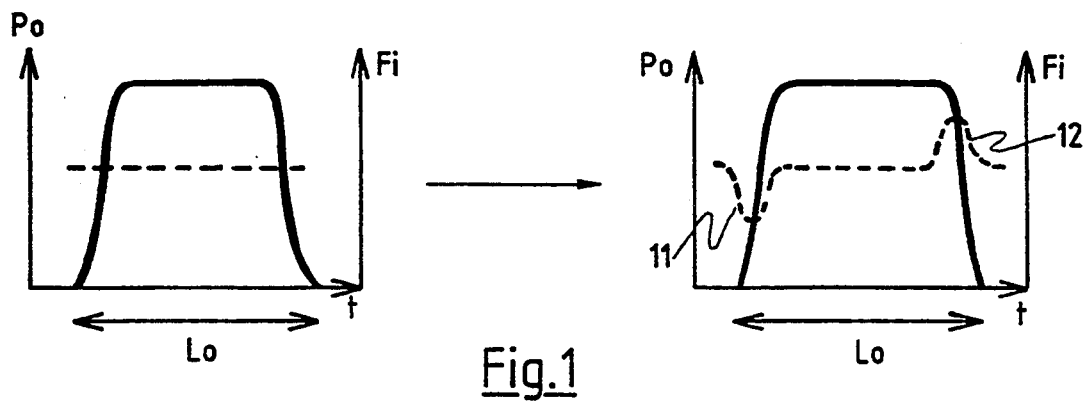
FIGS. 1 to 4 show curves of variation of the optical power PO and of the instantaneous optical frequency FI as a function of time t, FIG. 1 corresponding to a pulse sent without compensation and to the same pulse received at the end of the line when the chromatic dispersion of the fiber is zero.

The first graph of FIG. 1 corresponds to a pulse sent without compensation. The pulse has a width $L_0$. The instantaneous frequency FI is constant.

This pulse is transmitted through a very-long-distance fiber (corresponding to a distance of several thousands of kilometers) with zero chromatic dispersion (this is a theoretical situation). The pulse received at the end of the line is shown in the second graph of FIG. 1.

Since it is assumed that the chromatic dispersion of the fiber is zero, the width $L_0$ of the pulse is not modified.

By contrast, the non-linear effects and, notably, the most important effect in the fiber (the Kerr effect), which is very weak in the usual fields of operation of the optical systems (i.e. for distances of less than 400 km and a power of less than 10 Mw) become non-negligible for very high power values (1 W) or for very large distances of propagation (some thousands of kilometers) with reasonable optical power values (1 mV).

These non-linear effects generate a self-phase modulation that appears on the curve of variation of the instantaneous optical frequency FI as a function of the time t. The instantaneous optical frequency FI (derivative with respect to the time of the phase) diminishes at the start (11) of the pulse and then increases at its end (12).

In the system according to the invention, compensation is provided by anticipation for the self-phase modulation generated by the non-linear effects.

Figure 2:
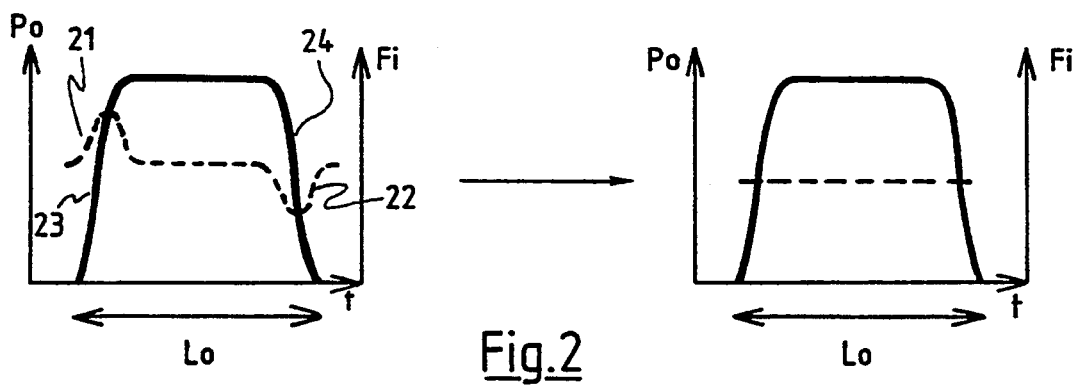

The first graph of FIG. 2 corresponds to the pulse sent with compensation. The optical power PO is unchanged with respect to the optical power as shown in the first graph of FIG. 1. By contrast, the instantaneous optical frequency FI is increased at the start (21) of the pulse (during the rising edge 23) and then diminishes at its end (22) (during the descending edge 24).

This pulse is transmitted through a very-long-distance fiber with zero chromatic dispersion. At the end of the line, the pulse received (corresponding to the second graph of FIG. 2) has a constant instantaneous frequency FI.

In other words, the pulse received corresponds substantially to that shown in the first graph of FIG. 1. For the receiver, everything happens as if the transmission line induced no disturbance.

Indeed, the phase modulation has been chosen so that after propagation on a given distance (several thousands of kilometers), the non-linear effects are compensated for.

Since the chromatic dispersion is assumed to be zero, the width $L_0$ of the pulse is not modified and the non-linear effects are compensated for with precision.

However, in a real link, the chromatic dispersion is not strictly zero. In order to get rid of the constraints of the phenomena of modulation instability, and to preserve pulses having a certain integrity, the method uses chromatic dispersion fibers with a very low negative value (of the order of -0.1 ps/nm/km).

Figure 3:
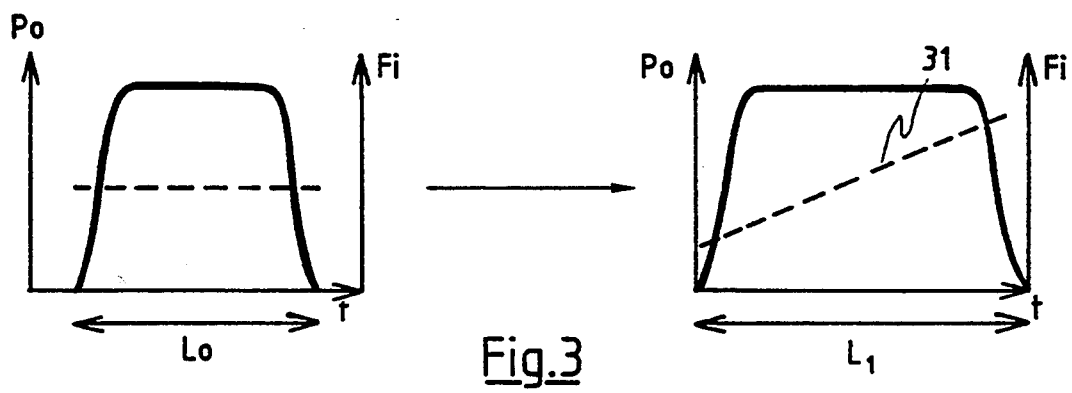

The first graph of FIG. 3 corresponds to a pulse emitted without compensation. The pulse has a width $L_0$ and the instantaneous frequency FI is constant.

This pulse is transmitted through a very-long-distance fiber with negative chromatic dispersion. The second graph corresponds to the pulse received at the end of the line. The combination of the non-linear effects and of the dispersion modifies the instantaneous frequency FI. At the end of the line, the instantaneous frequency FI is quasi-linear (31) and has a slope corresponding to the chromatic dispersion undergone (the "bulges" 11 and 12 are no longer seen). Its spectrum has widened with the lowest frequencies at the start of the pulse and the highest frequencies at the end of the pulse.

Besides, the negative chromatic dispersion, combined with the non-linear effects, induces a temporal widening of the pulse. The width $L_1$ of the pulse received is greater than the width $L_0$ of the pulse that is sent. This prompts intersymbol interferences (two pulses sent out consecutively overlap and disturb each other partially at the receiver).

In order to reduce these inter-symbol interferences according to the invention, the pulse that is sent out is compensated for by anticipation. The first graph of FIG. 4 corresponds to a pulse sent out with a compensation such as this.

The instantaneous frequency FI rises at the start (41) of the pulse and then diminishes at its end (42). This pulse is transmitted through a very-long-distance fiber with negative chromatic dispersion.

Figure 4:
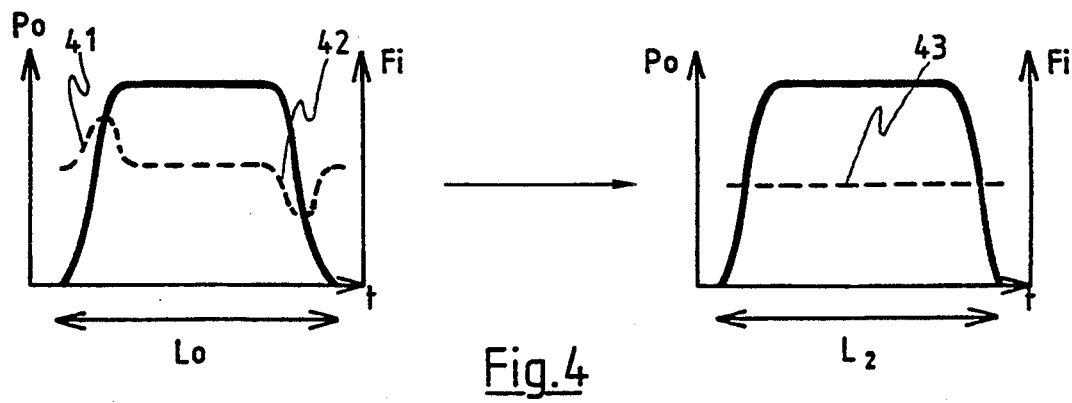

The second graph of FIG. 4 corresponds to the pulse received at the end of the line. The non-linear effects, which are perfectly compensated for when the chromatic dispersion is zero, are again in this case very well (but no longer completely) compensated for. The instantaneous frequency FI is substantially constant (43). In fact, the curve 43 is not perfectly linear, but is appreciably disturbed and has a slight positive slope. The pulse is slightly wider (its width $L_2$ is between the width $L_0$ of the pulse sent out and the width $L_1$ of the pulse received without compensation at transmission). These disturbances have a negligible effect on the reconstruction of the source signal.

It is observed therefore that the treatment described with reference to FIG. 2 in the case of a fiber without dispersion makes it possible to obtain very good results in the real case of a fiber with non-zero dispersion.

Figure 7:
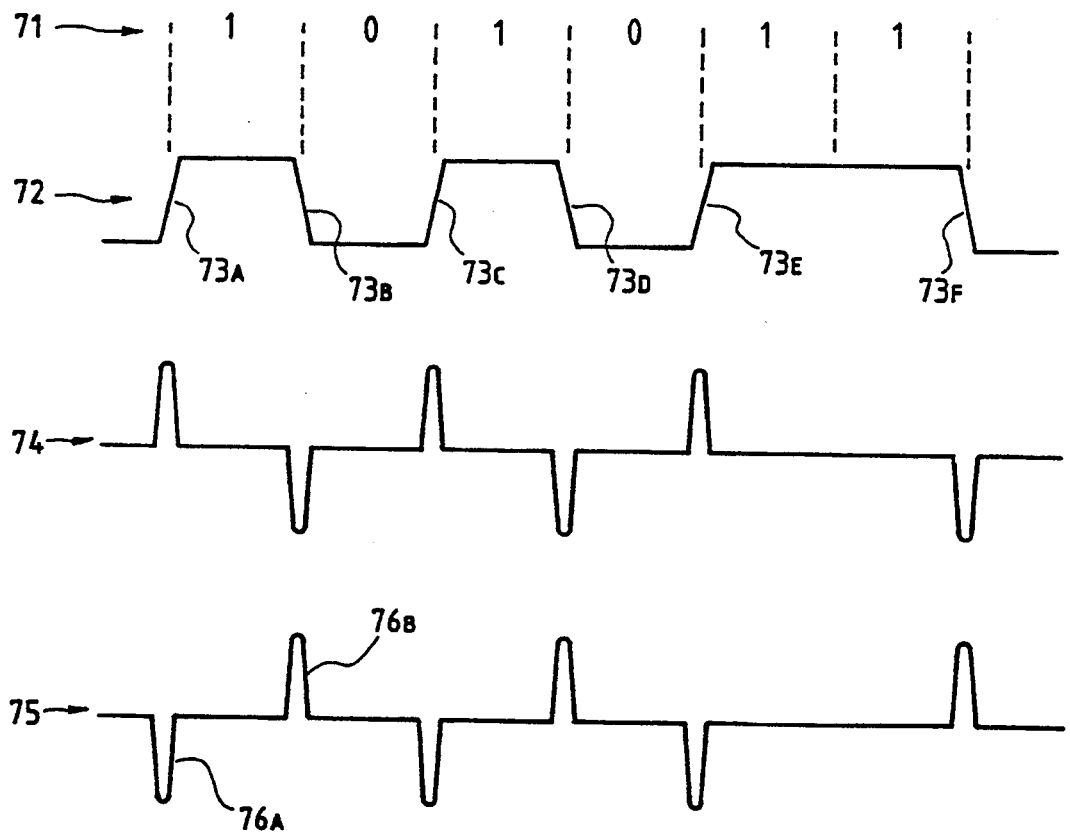
FIG. 7 illustrates the general principle of the invention, based on the particular example of a digital sequence.

FIG. 7 illustrates the principle of the invention, in an example of a digital signal comprising the binary sequence 71 101011. This digital sequence is coded in NRZ (Non Return to Zero) mode and modulated in all-or-nothing amplitude modulation (72). Other types of coding (for example RZ) may of course be used.

According to the invention, the optical frequency of the signal is modified at the instants of the transitions $73_A$ to $73_F$ of the digital signal 72. In other words, the modifications of the instantaneous optical frequency are a function of the mathematical derivative 74 of the digital signal 72.

More specifically, the curve of the variations of the instantaneous optical frequency 75 is substantially opposite to the derivative 74. Thus, to a rising edge $73_A$ of the signal 72, there corresponds a localized drop $76_A$ of the instantaneous optical frequency. Conversely, the optical frequency 75 increases ($75_B$) during a descending edge $73_B$.

The technique of the invention is therefore very different from that of the known methods for the correction of the chromatic dispersion by the application of a linear over-modulation to each binary element.

Indeed, according to this known technique, the over-modulation is applied throughout the duration of a binary element monotonically (with a continuous increase or decrease of the optical frequency in time). On the contrary, according to the invention, the over-modulation is applied selectively, solely during the transitions of the signal 72.

As a consequence, the processing applied to a binary element depends of the preceding processing operation (i.e. it depends on the presence or absence of a transition). On the contrary, according to the prior art, the processing applied to the binary element is routinely the same, whether or not there is a transition.

Finally and essentially, the known processing operation makes it possible to limit the chromatic dispersion (the specifically linear distortion). On the contrary, the technique of the invention also compensates for non-linear dispersions.

Figure 8:
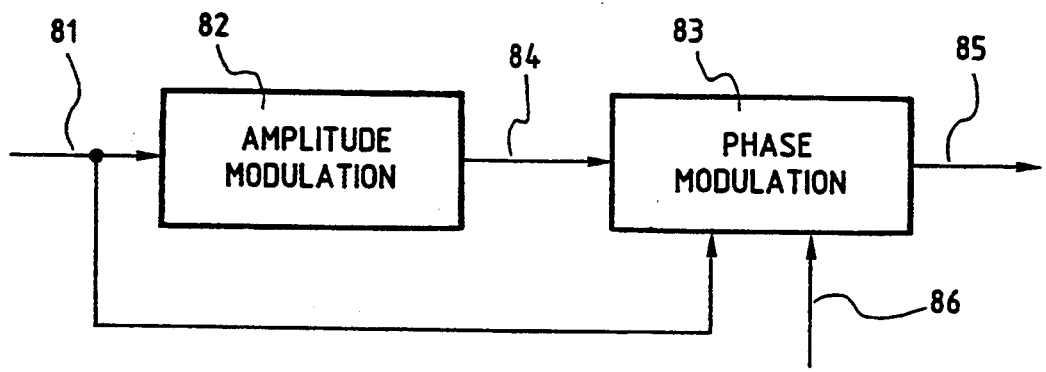
FIG. 8 is a schematic diagram of the modulation means for a transmitter station according to the invention.

FIG. 8 is a schematic drawing of the means implemented, according to the invention, in a transmitter station.

The digital signal 81 to be modulated is given simultaneously to amplitude modulation means 82 and phase modulation means 83.

The amplitude modulation means 82 are all-or-nothing modulation means that deliver a signal A(t) 84 having the following characteristics:
- if the digital signal 81 is equal to 0, then the optical power of the signal A(t) is zero;
- if the digital signal 81 is equal to 1, then the optical power assumes a predetermined power value (fixed notably as a function of the characteristics and length of the optical fiber).

The amplitude modulated signal 84 is then subjected to a phase modulation 83 which is aimed at modifying the instantaneous optical frequency of the signal 84, in a manner substantially opposite to the variations (derivative) of the source signal 81.

The signal 85 delivered by the phase modulation means may therefore be written in an optical field as:

$$U(t) = A(t) \cdot e^{j\Phi(t)},$$

with:

$$\Phi(t) = \alpha |A(t)|^2,$$

and where:
- A(t) is the real amplitude of the field, delivered by the amplitude modulation means,
- $\alpha$ is a real number,
- $\Phi(t)$ is the phase modulated by the phase modulation means,
- t is the time.

It can be easily verified, by this equation of the signal, that the phase of the signal $\Phi(t)$ (i.e. its instantaneous frequency) varies only when A(t) varies, i.e. solely during transmissions of the signal.

This pulse may, for example, take the following numerical values:

$$A(t) = 0.01 \cdot \exp\left[-\frac{1}{2}\left(\frac{t}{t_0}\right)^6\right] (\sqrt{W})$$

$$\phi(t) = \frac{\pi}{2} \cdot A^2(\gamma)/0.001 \text{ (radians)}$$

with $\tau$ in picoseconds and $t_0 = 100/(\text{Log }(2))^{1/6}$ (picoseconds).

This corresponds to a quasi-rectangular pulse with a width of 200 picoseconds and a peak power of 1 mW.

Advantageously, the phase modulation means 83 make it possible, additionally, to introduce a fixed variation of the optical instantaneous frequency according to the "chirp" technique.

The parameter of variation in instantaneous optical frequency (the chirp parameter) is defined by the formula:

$$C = (d\Phi/dt)/(dI/dt)/I$$

where $\Phi$ is the phase of the optical wave, I is its intensity and t is the time.

In the case of the numerically calculated example here above, the chirp parameter 86 is equal to $c = \pi/2$.

More generally, the number of parameters taken into account by the phase modulation means 83 may be great, in order to optimize the compensation for the distortions. These means may notably take account of:
- the optical power:
- the length of said optical fiber;
- the coefficient of chromatic dispersion of said optical fiber;
- the bit rate of said digital signal;
- the binary code format of said digital signal;
- the distance between two repetition amplifiers placed on said transmission line;
- the noise excess factor of said repetition amplifiers.

In other words, the correction has to be optimized and must take account, to the utmost possible extent, of the real characteristics of the fiber.

The compensation for the self-phase modulation due to the non-linear effects by a phase modulation at the source of transmission according to the invention (represented by the corresponding variation of the instantaneous frequency) gives very good results. For example for a transmission line possessing the following characteristics:
- operating wavelength of 1.55 $\mu$m,
- amplified link: 8,000 kilometers,
- bit rate equal to 5 Gbit/s,
- NRZ format,
- optical amplifiers at a distance of 40 km, each having a noise excess factor of 6 dB, attenuation of the fiber equal to 0.2 dB/km;
chromatic dispersion of the fiber equal to −0.1 ps/nm/km,
level of signal −3 dBm at output of amplifier,
the following results are obtained:
  without compensation, the system shows an eye-opening penalty of 2 dB in reception (this penalty being related to the phenomena of propagation) which leads to an error rate of about $10^{-9}$,
  with compensation according to the invention: the eye-opening penalty is cancelled for a chirp parameter equal to $\pi/2$ and the error rate obtained is better than $10^{-12}$, which represents a very great gain in transmission quality.

In the case of an on-line dispersion that is twice greater (−0.2 ps/nm/km), the system goes from a penalty of 5.5 dB without compensation to a penalty of 1 dB for a chirp parameter of $3\pi/2$.

Figure 5:
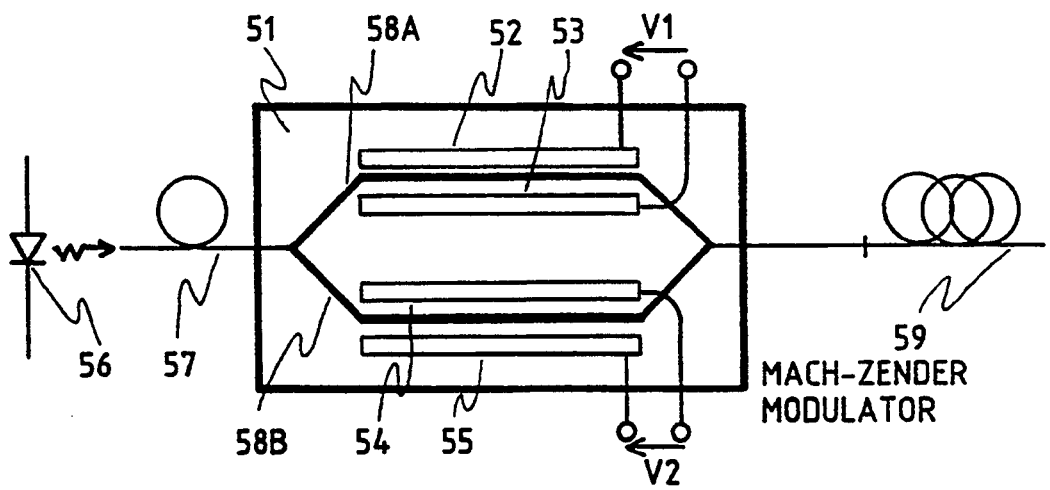
FIG. 5 shows a simplified drawing of a first embodiment of a system according to the invention, comprising an electro-optical amplitude modulator with four electrodes on lithium niobate.
Figure 6:
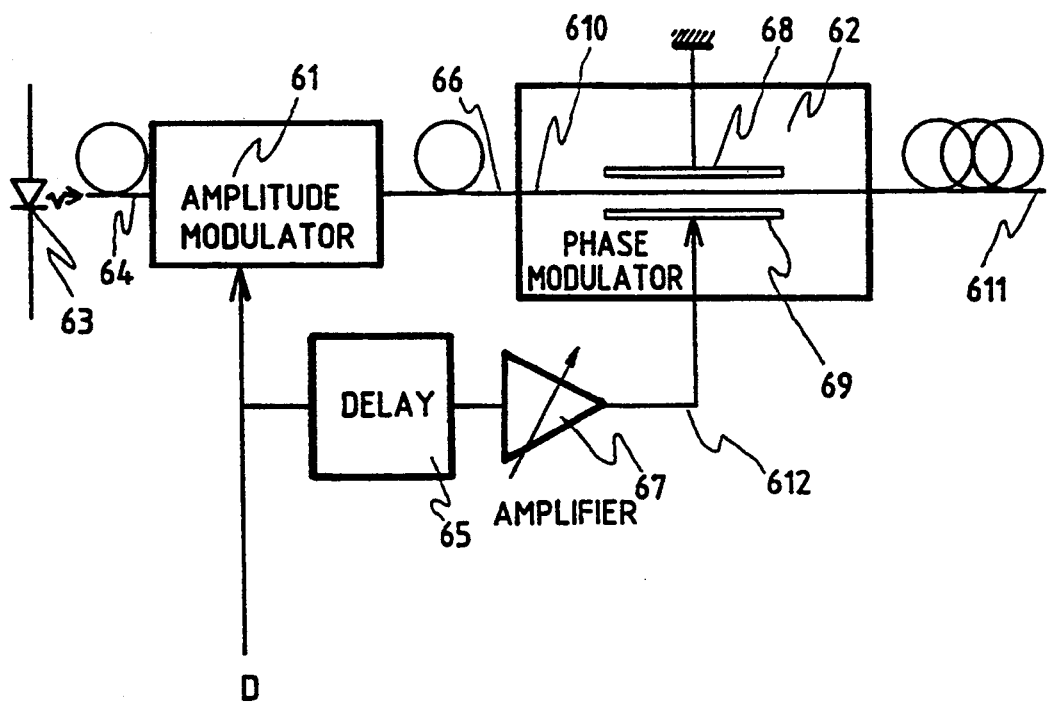
FIG. 6 shows a simplified drawing of a second embodiment of a system according to the invention, comprising an electro-optical amplitude modulator without variation of instantaneous optical frequency, followed by a phase modulator on lithium niobate.

FIGS. 5 and 6 each show a particular embodiment of a transmitter station according to the invention that can be used to obtain light pulses that are both amplitude modulated (with all-or-nothing modulation for example) and phase modulated (with a possibility of adjustment). As explained here above, the form of the phase modulation is chosen so as to compensate for the self-phase modulation induced by the non-linear effects due to the fiber.

A first embodiment of a transmitter station according to the invention is shown in FIG. 5. It has a Mach-Zender type modulator 51 on lithium niobate possessing four electrodes 52 to 55. This type of modulator is known per se. However, the application of a modulator such as this can generate a correct signal at the source of transmission according to the invention is of course a novel application.

A non-modulated transmitter laser 56 of any type, with a moderate line width, sends light in a fiber 57. This fiber 57 is connected to a modulator 51 with four electrodes 52 to 55. Inside this modulator, the light emitted by the transmitter laser 56 is conveyed by two diffused optical waveguides $58_A$ and $58_B$ placed in a lithium niobate crystal.

A first optical waveguide $58_A$ is located between two electrodes 52 and 53. A potential difference $V_1$ is applied between these two electrodes 52 and 53. This first input electrical voltage $V_1$ corresponds to the digital wavetrain to be sent.

A second optical waveguide $58_B$ is located between two other electrodes 54 and 55. A potential difference $V_2$ is applied between these other two electrodes 54 and 55. This second input electrical voltage $V_2$ corresponds to the sum of the reversed digital data train and a DC voltage $V_0$. This DC voltage $V_0$ makes it possible to adjust the parameter of variation of instantaneous frequency (chirp parameter).

Thus, if DATA is the electrical digital train, we have:

$$V_1 = \overline{\text{DATA}};$$
$$V_2 = \text{DATA} + V_0$$

Then, the two optical waveguides $58_A$ and $58_B$ meet. The combination of the signals borne by these two waveguides produces, at output of the modulator, pulses that are modulated both in amplitude and in phase (it can easily be ascertained that this combination delivers a signal U(t) having the above described form).

These pulses correspond to the digital data train to be sent on the fiber-optic link 59.

A second embodiment of a transmitter station according to the invention is shown in FIG. 6. It includes a chirp-free electro-optical amplitude modulator 61. A digital data train D controls the amplitude modulator 61.

The modulator delivers a signal A(t) equal to 0 if D is equal to 0, and a predetermined power if D is equal to 1.

This amplitude modulator 61 is connected to a phase modulator 62 by a fiber 66.

The phase modulator 62 is also controlled by the digital data train D. In order that the two modulators 61 and 62 may be controlled synchronously by the digital data train D, a delay is applied, by means of a module 65, to the digital data train D, before it reaches the phase modulator 62. This delay is equal to the optical propagation time $\tau$ between the respective instants of arrival of the digital data train at the modulator 61 and the modulator 62.

The phase modulator 62 is made on lithium niobate. It has two electrodes 68 and 69 between which there is applied a potential difference corresponding to the digital data train D to be sent.

The pulses (amplitude modulated by the modulator 61 located upline) are conveyed into the phase modulator 62, by a diffused optical waveguide 610 placed in a lithium niobate crystal.

Thus, when the (delayed) signal 612 shows a transition, the phase of the signal to be sent is modified, in accordance with the principle of the invention. In other words, when the transition is a rising transition, the instantaneous optical frequency diminishes momentarily, and vice versa.

Through an electrical amplifier 67 with adjustable gain, the value of the chirp parameter of the phase modulator 62 may be adjusted.

Thus, at output of the phase modulator 62, the pulses are amplitude modulated and phase modulated. These pulses correspond to the digital data train D. The compensation, in phase modulation form, can be used to act against the self-phase modulation due to the non-linear effects of the fiber 611 of the long-distance transmission line.

What is claimed is:
1. A system for reducing perturbations due to non-linear effects occurring during very long-distance transmission of a digital signal on a fiber-optic transmission line having a length of at least one thousand kilometers and a chromatic dispersion less than 0.5 ps/nm/km, said fiber-optic transmission line connecting a transmitter station to a receiver station;
  said digital signal having rising edges and descending edges between two predetermined signal levels, respectively representing a first and a second binary values that can be assumed by said digital signal;
  said transmitter station comprising:
    means for amplitude modulating said digital signal, delivering an amplitude modulated signal having an instantaneous optical frequency with a predetermined value;
    means for controlling said instantaneous optical frequency, selectively comprising:
      means for increasing said instantaneous optical frequency of said amplitude modulated signal, during descending edges of said digital signal;

means for decreasing said instantaneous optical frequency of said amplitude modulated signal, during said rising edges;

means of maintaining said instantaneous optical frequency of said amplitude modulated signal equal to said predetermined value, when said digital signal has one of said predetermined levels; and said increasing means and decreasing means having values determined so as to induce controlled anticipated perturbations of the signal which are substantially complementary to perturbations due to said non-linear effects, so that the modulated signal received in said receiver station has reduced non-linear perturbations.

2. A system according to claim 1, wherein said means for controlling said instantaneous optical frequency act in such a way that said instantaneous optical frequency is substantially proportional and opposite to a mathematical derivative of said amplitude modulated signal.

3. A system according to claim 1, wherein said means for controlling said instantaneous optical frequency include means for phase modulating said amplitude modulated signal.

4. A system according to claim 1, wherein said means for controlling said instantaneous optical frequency take account of at least one of the information elements belonging to the group comprising:

optical power along said transmission line;
length of said optical fiber;
coefficient of chromatic dispersion of said optical fiber;
bit rate of said digital signal;
binary coding format of said digital signal;
distance between two repetition amplifiers placed on said transmission line; and
noise excess factor of said repetition amplifiers.

5. A system according to claim 1, wherein said transmitter station produces pulses for which the optical field is written as:

$$U(t) = A(t) \cdot e^{j\Phi(t)}$$

with:

$$\Phi(t) = \alpha \cdot A(t)^2$$

where:

A(t): amplitude of said optical field,
α: a constant,
t represents time, and where term A(t) corresponds to a contribution of said means for amplitude modulating and term $e^{j\Phi(t)}$ corresponds to contribution of said means for controlling said instantaneous optical frequency.

6. A system according to claim 1, wherein said means for amplitude modulating are all-or-nothing modulation means.

7. A system according to claim 1, wherein said optical fiber is a monomode fiber with low negative chromatic dispersion.

8. A system according to claim 1, wherein said digital signal is encoded according to RZ binary format.

9. A system according to claim 1, wherein said digital signal is encoded according to NRZ binary format.

10. A system for reducing perturbations due to non-linear effects occurring during very long-distance transmission of a digital signal on a fiber-optic transmission line having a length of at least one thousand kilometers and a chromatic dispersion less than 0.5 ps/nm/km, said fiber-optic transmission line connecting a transmitter station to a receiver station;

said digital signal having rising edges and descending edges between two predetermined signal levels, respectively representing a first and a second binary values that can be assumed by said digital signal;

wherein said transmitter station includes an electro-optical amplitude modulator with two diffused optical waveguides, each of said optical waveguides being associated respectively with a first set and a second set of two electrodes;

said first set of two electrodes being supplied with a first electrical voltage (VI) representing said digital signal; and said second set of two electrodes being supplied with a second electrical voltage (V2) corresponding to a sum of said first electrical voltage reversed and a DC electrical voltage.

11. A system according to claim 10, wherein said electro-optical amplitude modulator comprises means for adjusting said DC electrical voltage.

12. A system according to claim 10, wherein said modulator is made out of a lithium niobate crystal.

13. A system for reducing perturbations due to non-linear effects occurring during very long-distance transmission of a digital signal on a fiber-optic transmission line having a length of at least one thousand kilometers and a chromatic dispersion less than 0.5 ps/nm/km, said fiber-optic transmission line connecting a transmitter station to a receiver station;

said digital signal having rising edges and descending edges between two predetermined signal levels, respectively representing a first and a second binary values that can be assumed by said digital signal;

wherein said transmitter station comprises:

an electro-optical amplitude modulator, controlled by an electrical signal (D) representing said digital signal and delivering an amplitude modulation signal; and a phase modulator, acting on said amplitude modulated signal and controlled by said electrical signal (D) delayed by a period that is substantially equal to a delay introduced by said amplitude modulator.

14. A system according to claim 13, wherein said delayed signal is amplified by adjustable gain amplifier means.

15. A system according to claim 13, wherein said phase modulator is made out of a lithium niobate crystal.

* * * * *

UNITED STATES PATENT AND TRADEMARK OFFICE
CERTIFICATE OF CORRECTION

PATENT NO. : 5,373,382

DATED : December 13, 1994

INVENTOR(S) : Pirio, et al.

It is certified that error appears in the above-indentified patent and that said Letters Patent is hereby corrected as shown below:

In column 2, line 13, "nonlinear" should be --non-linear--.

In column 2, line 16 should be part of line 15 (does not begin a new paragraph).

In column 4, line 45, "nonlinear" should be --non-linear--.

In column 7, line 45, "Mw" should be --mW--.

In column 7, line 48, "(1mV)" should be --(1mW)--.

In column 8, line 38, "intersymbol" should be --inter-symbol--.

Signed and Sealed this

Third Day of October, 1995

Attest:

BRUCE LEHMAN

Attesting Officer

Commissioner of Patents and Trademarks